(12) United States Patent
Noldus et al.

(10) Patent No.: US 8,923,140 B2
(45) Date of Patent: Dec. 30, 2014

(54) OBTAINING SIGNALLING INFORMATION IN A PACKET SWITCHED NETWORK

(75) Inventors: Rogier August Caspar Joseph Noldus, Goirle (NL); Jos Den Hartog, Capelle a/d Ijssel (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 190 days.

(21) Appl. No.: 13/703,781

(22) PCT Filed: Jun. 17, 2010

(86) PCT No.: PCT/EP2010/058575
§ 371 (c)(1),
(2), (4) Date: Jan. 18, 2013

(87) PCT Pub. No.: WO2011/157297
PCT Pub. Date: Dec. 22, 2011

(65) Prior Publication Data
US 2013/0235741 A1 Sep. 12, 2013

(51) Int. Cl.
H04W 24/06 (2009.01)
H04L 29/06 (2006.01)
H04W 4/00 (2009.01)

(52) U.S. Cl.
CPC ........... *H04W 24/06* (2013.01); *H04L 65/1006* (2013.01); *H04L 65/1069* (2013.01); *H04W 4/00* (2013.01)
USPC ............................ 370/250; 370/328; 370/400

(58) Field of Classification Search
None
See application file for complete search history.

(56) References Cited

U.S. PATENT DOCUMENTS

| 8,191,074 B2* | 5/2012 | Rahman et al. ............... 719/310 |
| 2007/0130345 A1* | 6/2007 | Da Palma et al. ............ 709/227 |
| 2007/0280453 A1 | 12/2007 | Kelley et al. |

FOREIGN PATENT DOCUMENTS

| EP | 2079216 A1 | 7/2009 |
| WO | 2009074846 A1 | 6/2009 |

OTHER PUBLICATIONS

International Search Report (mailed Jul. 20, 2011) In re: International Application No. PCT/EP2010/058575.
Kaplan, H. et al; "A Session Identifier for the Session Initiation Protocol (SIP)"; Dispatch Working Group Internet Draft; Dec. 22, 2009; pp. 1-11; IETF; [retrieved on Dec. 12, 2012]; Retrieved from the Internet: http://tools.ietf.org/id/draft-kaplan-dispatch-session-id-00.txt.
Dawes, P.; "Private Extension to the Session Initiation Protocol (SIP) for Debugging"; Vodafone Group Internet-Draft; Feb. 2, 2010; pp. 1-17; IETF; [retrieved on Dec. 12, 2012]; Retrieved from Internet: http://tools.ietf.org/id/draft-dawes-sipping-debug-02.txt.
Sparks, R.; "The Session Initiation Protocol (SIP) Refer Method"; Network Working Group Request for Comments: 3515; Apr. 2003; pp. 1-22; IETF; [retrieved on Dec. 12, 2012]; Retrieved from Internet: http://www.ietf.org/rfc/rfc3515.txt.

* cited by examiner

*Primary Examiner* — Donald Mills
(74) *Attorney, Agent, or Firm* — Coats & Bennett, PLLC

(57) ABSTRACT

A method for a first node obtaining signalling information in a packet switched network. The method comprises the steps of the first node sending a first request message comprising a first request for collecting signalling information towards a second node comprised by the packet switched network; the first node receiving a first response message, the first response message comprising a signalling information added by the second node and the signalling information collected by the second node in response to the first request message.

9 Claims, 7 Drawing Sheets

OBTAINING SIGNALLING INFORMATION IN A PACKET SWITCHED NETWORK

TECHNICAL FIELD

The invention relates to a method and nodes for obtaining signalling information in a packet switched network.

BACKGROUND

An IMS network is an architectural framework for delivering Internet Protocol (IP) multimedia services. Session Initiation Protocol (SIP) is used for signalling within the IMS network; i.e. for routing request messages and response messages within the network. While designing, maintaining and/or servicing IMS networks, it may be necessary to analyse SIP requests and responses in the IMS network, traversing nodes or proxies such as a "Proxy Call Session Control Function" (P-CSCF), a "Serving Call Session Control Function" (S-CSCF), an "Interrogating Call Session Control Function" (I-CSCF), an "Interconnect Border Control Function" (IBCF), and other nodes.

It is known that when SIP signalling messages traverse an IMS network via the abovementioned nodes, signalling information may be generated by the abovementioned nodes, on entry of the SIP signalling messages in the respective node and on departure of the SIP signalling messages from the respective node. Such information may be in the form of trace records generated by the nodes, which may be sent by the nodes to a server arranged for collecting such trace records and assembling these records into a single trace pertaining to a single session establishment that took place within the IMS network.

With the advent of "IMS roaming" and "IMS interconnect", whereby SIP sessions may span two or more IMS networks, the number of SIP proxies that SIP sessions will traverse increases. As a consequence, the collecting trace information server, e.g. debug server, needs to perform extensive post-processing on collected trace records to retrieve the desired information belonging to the session to be analysed. Elaborate book keeping and a dedicated server is required to assemble the information for analysing a particular session.

SUMMARY

It is therefore an object of the invention to obviate the above identified problems.

The object is achieved according to the invention in a method for a first node obtaining signalling information in a packet switched network. The method comprises the steps of the first node sending a first request message comprising a first request for collecting signalling information towards a second node comprised by the packet switched network; the first node receiving a first response message, the first response message comprising a signalling information added by the second node and the signalling information collected by the second node in response to the first request message.

Instead of receiving signalling information from a collecting trace information server or debug server, the first node now receives the signalling information directly from the second node in the path in the packet switched network involved in routing the message to the first network, i.e. for incoming calls, so no more debug server for assembling signalling information is needed.

In an embodiment according to the invention the first response message may comprise additional signalling information added by at least one third node in the packet switched network, whereby the at least one third node is involved in the step of sending the first request message or receiving the first response message between the first and the second node. The additional signalling information is collected by the at least one third node in response to the first request message or to the first response message.

Book keeping is now performed while the message that collects the signalling information is being routed through the packet switched network using the at least one third node or a plurality of third nodes.

In another embodiment according to the invention, the first request message comprises a call setup request message such that signalling information regarding the call setup request is collected.

This way signalling information may be collected by setting up a call to or from a terminal or user equipment.

In another embodiment according to the invention, the first node receives a call setup request message, whereby the call setup request message is submitted by the second node in response to the first request message. The call setup request comprises a second request for collecting signalling information.

In another embodiment according to the invention, the first node sends a second response message in response to the receiving of the call setup request message, includes signalling information comprised in the received call setup request message into the second response message and receives in response to that the first response message comprising the collected signalling information the collected signalling information comprised in the first response message selected by the second node from the second response message.

This allows collecting signalling information in a path from the first node to the second node in addition to already collected signalling information from the second node to the first node.

In further embodiment according to the invention, the call setup request message comprises additional signalling information added by at least one third node in the packet switched network, the at least one third node involved in the step of receiving the call setup request message or sending the second response message between the first and the second node, the additional signalling information collected by the at least one third nodein response to the call setup request message or to the second response message.

This allows signalling information to be collected while routing the call setup message through third nodes within the packet switched network between the first and second node.

In another embodiment according to the invention, the first node generates the first request message comprising a request for collecting signalling information during an established call between the first and the second node.

In another embodiment according to the invention, the first node receives a call setup request message, the call setup request message submitted by the second node in response to the first request message, the call setup request comprising a second request for collecting signalling information.

This allows for example a helpdesk of a provider for telecommunication services to make a user equipment such as a telephone in a packet switched network to set up a call and trace the call, i.e. obtain signalling information.

In a further embodiment of the invention, the first response message comprises additional signalling information added by at least one third node in the packet switched network. The at least one third node is involved in the step of sending the first request message or receiving the call setup request message between the first and the second node. The additional signalling information collected by the at least one third node is collected in response to the first request message or the call setup request message.

This allows intermediate nodes in the packet switched network to add signalling information to the collected signalling information.

In a further embodiment according to the invention, the call setup request message is a Session Initiation Protocol, SIP, message. Furthermore the first request message may be a Session Initiation Protocol, SIP, Refer message.

This allows application of the invention in Internet Protocol packet switched networks such as IP Multimedia Subsystem (IMS) networks.

The object is furthermore achieved according to the invention in a node for a packet switched network, fit for acting as the first node in the method described above. The node may comprise a processor, a storage medium, a communication interface for communicatively connecting the node to the packet switched network, the communication interface being arranged to send and receive a message to- and from the packet switched network. In this node the processor is arranged for generating a message with a request for collecting signalling information. The processor is further arranged to receive a message having added thereto signalling information in response to the request for collecting signalling information.

This allows the node to obtain signalling information from the packet switched network immediately without the need for a collecting trace information server or debug server.

The node may be equipped with an optional user interface for displaying the collected signalling information. Furthermore the collected signalling information may be stored in the storage medium.

The node may be for example at least one of a user equipment, and a help desk server from where a user may participate in communication sessions within the packet switched network where collecting signalling information is triggered and signalling information is received from incoming or outgoing traffic or both.

The object is furthermore achieved according to the invention in another node for a packet switched network, fit for acting as the second node in the method described above. The node may comprise a processor, a storage medium, a communication interface for communicatively connecting the node to the packet switched network, the communication interface being arranged to send and receive a message to- and from the packet switched network. In this node the processor is arranged for generating a message with a request for collecting signalling information. The processor is arranged for receiving a message with a request for collecting signalling information. The processor is further arranged to send a message with a request to add signalling information to the message to the packet switched network in response to the message with the request for collecting signalling information.

This node may operate as a test node, e.g. server or user equipment, and cooperate with another node from which a request may be received to assist in collecting signalling information relating to traffic to and from the other node.

The object is furthermore achieved according to the invention in another node for a packet switched network, fit for acting as the third node in the method described above. The node may comprise a processor, a storage medium, a communication interface for communicatively connecting the node to the packet switched network, the communication interface being arranged to send and receive a message to- and from the packet switched network. In this node the processor is arranged for generating a message with a request for collecting signalling information. The processor is arranged for receiving a message with collected signalling information and with a request for to add signalling information to the collected signalling information in the message. The processor is further arranged to add signalling information pertaining to the node in response to the collected signalling information in the message with the collected signalling information and the request for adding signalling information. The processor is further arranged for sending or forwarding the message with the request for adding signalling information to the message and the collected signalling information to another node in the packet switched network.

This node may operate as to fulfil the collecting of signalling information as communication sessions are set up between the earlier described nodes, i.e. the first and second nodes. This node adds signalling information when a message relating to collecting signalling information passes through.

Thus the three node described above cooperate in achieving the object of the invention.

BRIEF DESCRIPTION OF THE DRAWINGS

The invention will be further elucidated using the following drawings.

Within the drawings and the following description, like reference numerals refer to like elements or features.

DETAILED DESCRIPTION

The invention will be further elucidated in the following description using the attached drawings as outlined above.

Figure 1:
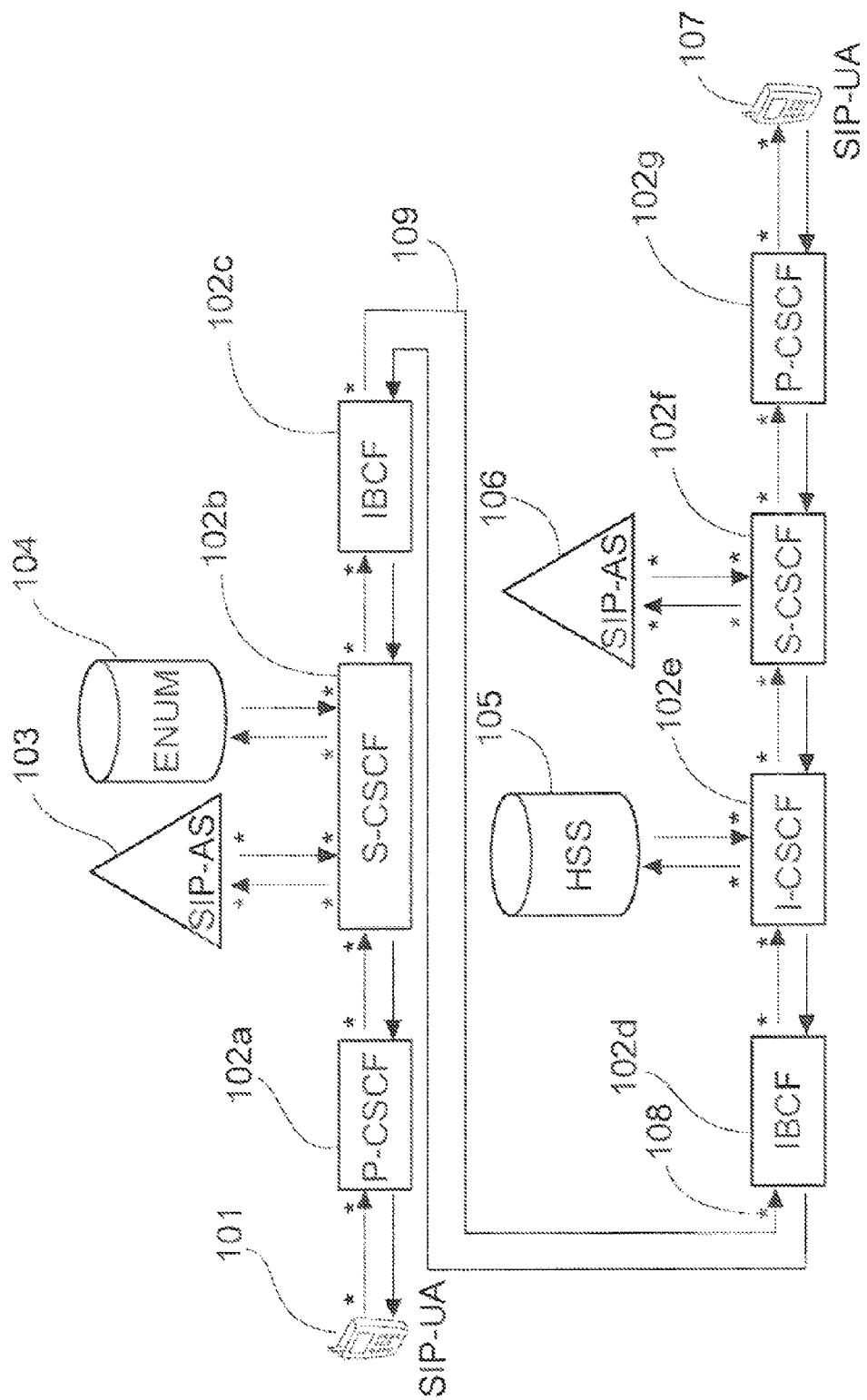
FIG. 1 shows an example of an IMS network for routing a SIP message according to the state of the art.

FIG. 1 shows an example of an IMS network for routing a SIP message according to the state of the art. The IMS network comprises a User Equipment (UE) 101, for example a mobile phone, communicatively connected to a range of nodes or proxies 102a-102g, and ultimately connected to another User Equipment (UE) 107 such as another mobile phone. The chain of proxies 102a-102g may comprise one or more P-CSCF, S-CSCF, IBCF, I-CSCF. Some of these proxies 102a-102g may in turn be communicatively connected to other equipment such as a SIP Application Server (SIP-AS) 103, 106, a number conversion database (ENUM) 104 or a Home Subscriber Server (HSS) 105. The asterisks "*" 108 indicate locations in the chain where information for analyses of SIP sessions may be generated. Thus FIG. 1 depicts the accumulation of information for analysis for e.g. a SIP Invite request message, originated in UE 101 having a SIP User Agent (SIP-UA), travelling through the chain of proxies 102a-102g up to destination UE 107 of the called party, the UE 107 also communicating with the IMS network via a User Agent (SIP UA).

Figure 2A:
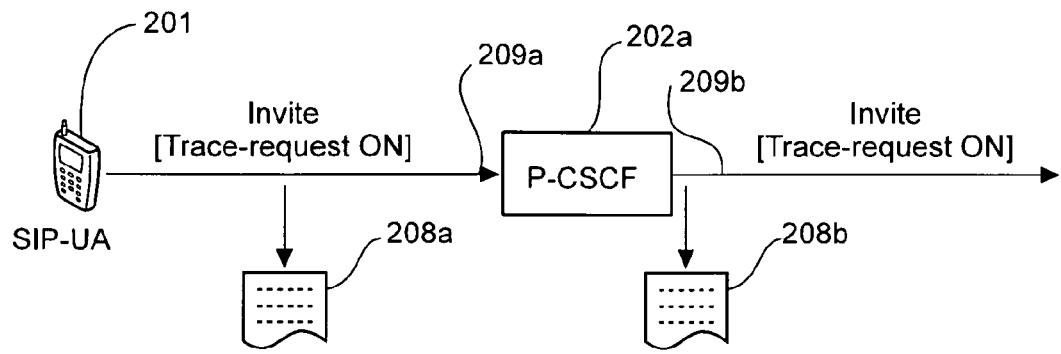
FIG. 2A shows an example of generating information for analysing a SIP session in an IMS network according to the state of the art.

FIG. 2A shows an example of generating information for analysis of SIP sessions in an IMS network according to the state of the art. FIG. 2A depicts the accumulation of addressing information for a SIP Invite request message 209a being sent by UE 201 to P-CSCF 202a using the UE 201 SIP-UA.

The UE 201 SIP-UA asserts a SIP trace request to the SIP Invite message 209a. The SIP-UA also generates the addressing information 208a related to the sending of the SIP-Invite request 209a towards the P-CSCF 202a. The P-CSCF 202a verifies that the SIP-UA is entitled to use this function. If the calling party UE SIP UA 201 is entitled to use this function, then the P-CSCF 202a retains the trace request in the SIP Invite request 209a and generates addressing information related to the sending of the SIP Invite request 209b towards the S-CSCF 202b (not shown in FIG. 2A). If the calling party UE SIP UA 201 is not entitled to use this function, then the P-CSCF 202a does not include the trace request in the SIP Invite request 209b.

Figure 2B:
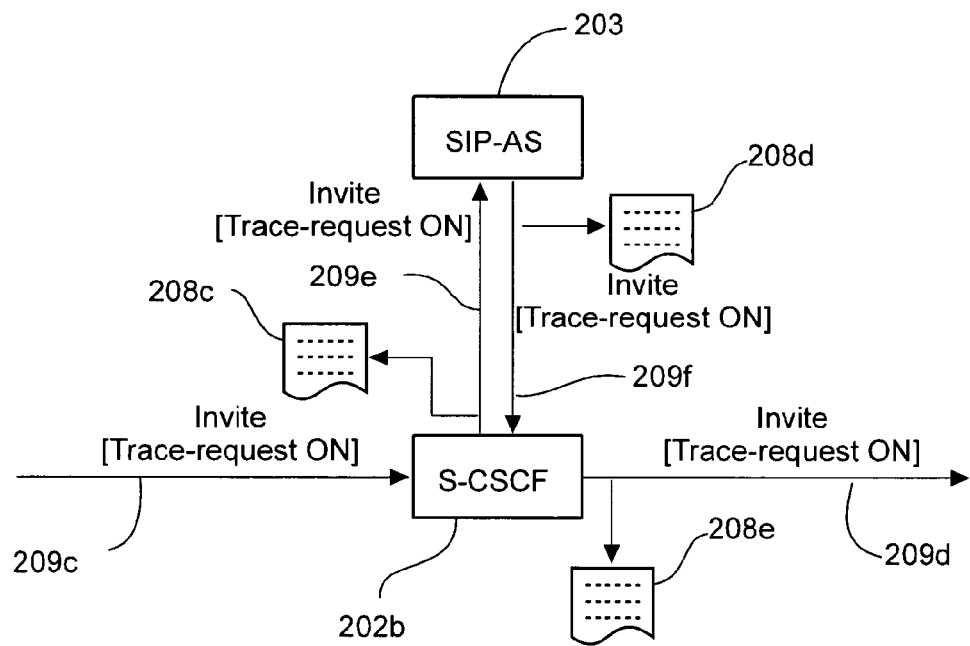
FIG. 2B shows another example of generating information for analysing a SIP session in an IMS network according to the state of the art.

FIG. 2B shows another example of generating information for analysis of SIP sessions in an IMS network according to the state of the art. FIG. 2B depicts the generating of trace information for a SIP Invite request message 209c received by the S-CSCF 202b. S-CSCF 202b generates addressing information as trace information 208c when sending the SIP Invite 209e to the SIP-AS 203. Likewise, SIP-AS 203 generates addressing information 208d when sending the SIP Invite 209f back to S-CSCF 202b. S-CSCF 202b finally generates addressing information 208e when sending the SIP Invite 209d onwards to for example an I-CSCF (see FIG. 1 reference numeral 102e). Not depicted in FIG. 2B is an ENUM database as is shown in FIG. 1 connected to S-CSCF 102b.

Generating addressing oor signalling information as trace information by I-CSCF (102e) and other proxies (102a-102f) as shown in FIG. 1 takes the same form as for S-CSCF 202b and other nodes and other types of nodes. The trace information is stored in trace records which are sent by the respective proxies or nodes to a common debug server (not shown). In this description trace information and signalling information are ued as synonyms. A trace request is a request for collecting signalling information.

In FIGS. 2A and 2B generation of trace information is shown for a SIP Invite request generated by the SIP-UA of a calling party. Likewise information for analysing a SIP session, may be generated for a response message generated by the destination UE 107 of the called party e.g. the SIP-UA of the called party 107. Since this is already known in the art this is not further explained in this application. See refs. [1], [2] and [3] for further explanation.

To support SIP tracing, the SIP Invite request 209a, 209b, 209c, 209d contains a SIP trace request. The trace request has the form of a designated SIP header or designated parameter within an existing SIP header. SIP Invite 209a from the SIP UA of the UE 101 leads to SIP session establishment in a regular manner. SIP trace information is collected as the SIP Invite request 209a-209d traverses the IMS network on its way to the intended destination, e.g. the SIP UA of the called party's UE 207 (not shown in FIGS. 2A and 2B). Each proxy/node 102a-102g, 202a-202b adds one or more designated information element to the SIP trace, where each set of information elements is sent to a SIP trace collection point, e.g. the Debug server. Documents 208a-208e in FIGS. 2a and 2b represent the designated information elements, e.g. in the form of a private SIP header. The SIP trace request can be implemented by "P-Debug-Id" as described in reference [2].

Figure 3:
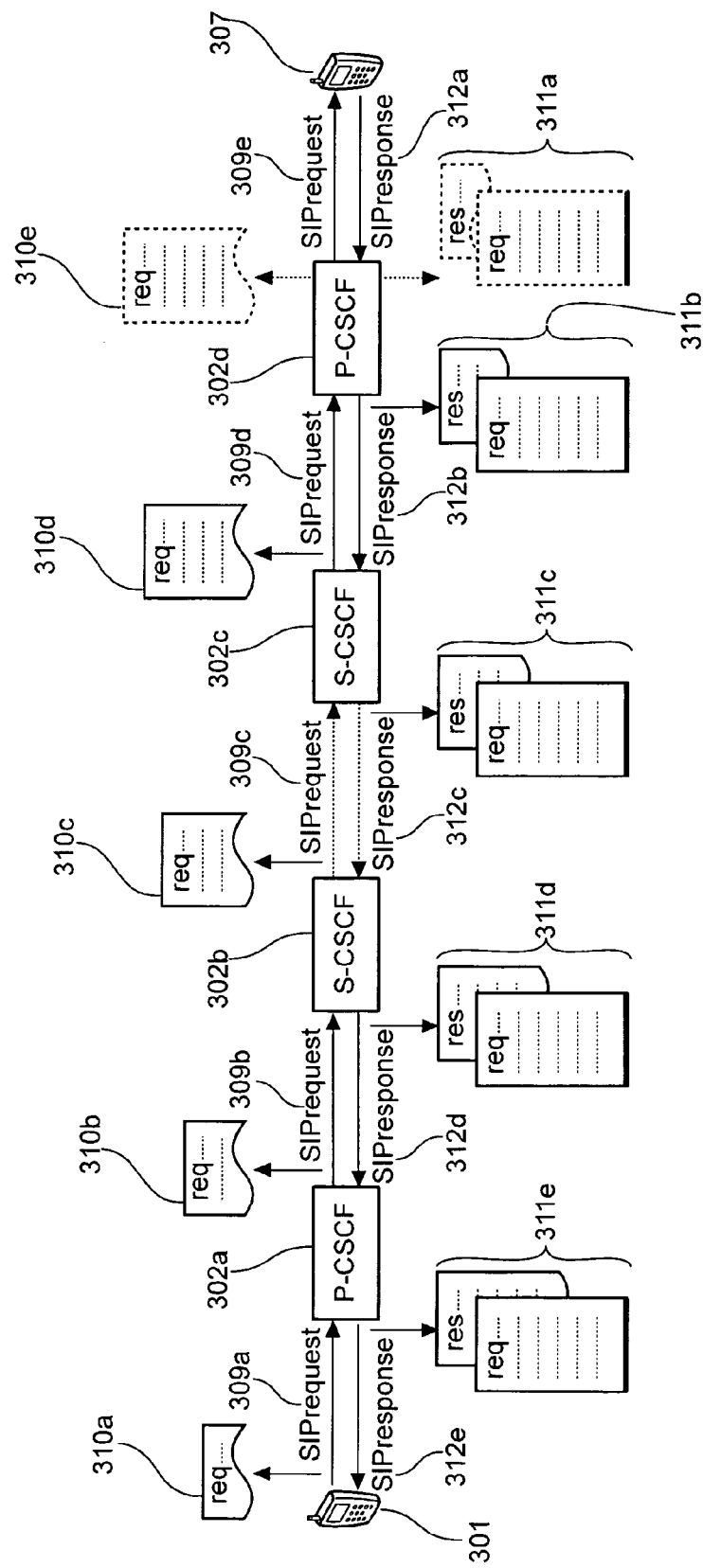
FIG. 3 shows an exemplary embodiment of generating trace information according to the invention.

FIG. 3 shows an exemplary embodiment of generating trace information according to the invention. The SIP trace (SIP addressing) information 310a-310e generated by SIP UA 301 and per SIP proxy 302a-302d may be included in the SIP request message, e.g. in the form of a SIP body component. The documents 310a-310e indicating "req" represent SIP trace information related to SIP request message. As shown in FIG. 3, SIP UA 301 and each proxy 302a-302d adds further trace information related to the SIP request message 309a-309d routed through the IMS network proxies 302a-302d to the already accumulated trace information. The documents 311a-311e indicated by "res" represent SIP trace information related to response message sent from the called subscriber UE 307 SIP UA in response to the SIP request 309a-309d. Each proxy 302a-302d adds trace information related to the SIP response 312a-312e routing to the already accumulated trace information. The document generated by P-CSCF 302d containing request routing information may or may not be included in the SIP request message 309e to the SIP UA of the called subscriber UE. It may also be included in the SIP response message generated by the SIP UA of the called subscriber UE 307. SIP UA of the called subscriber UE 307 will not generate SIP trace information related to the SIP response message 312a as described earlier but will forward the already acquired trace information of the request. So P-CSCF 302d will have to generate relevant trace information related to the SIP response message 312a.

SIP UA of the calling subscriber UE 301 now receives in the SIP response message, e.g. "OK", a complete overview of how the SIP request message (SIP Invite) as well as the SIP response message (OK) were routed. SIP UA of the calling subscriber UE 301 may write this information into a locked file.

The general concept of the invention as described above will now be further explained according to a few exemplary embodiments of the invention on a case by case basis related to various user requirements within the IMS network.

UE Requesting Trace Information for an Outgoing Call.

The user of a UE containing SIP UA wants information on SIP signaling form outgoing SIP call. The SIP UA adds a Trace request to an outgoing SIP Invite request message. The SIP response message, e.g. "OK", contains the trace information. The trace information received by the SIP UA of the caller UE contains information related to the SIP request message (SIP Invite) as well as information related to the SIP response message. When multiple SIP response messages are returned, then each response message may contain trace information. The routing of the SIP Invite request and response messages through the IMS network is as depicted in FIG. 3.

UE Requesting Trace Information for Incoming Calls.

Figure 4A:
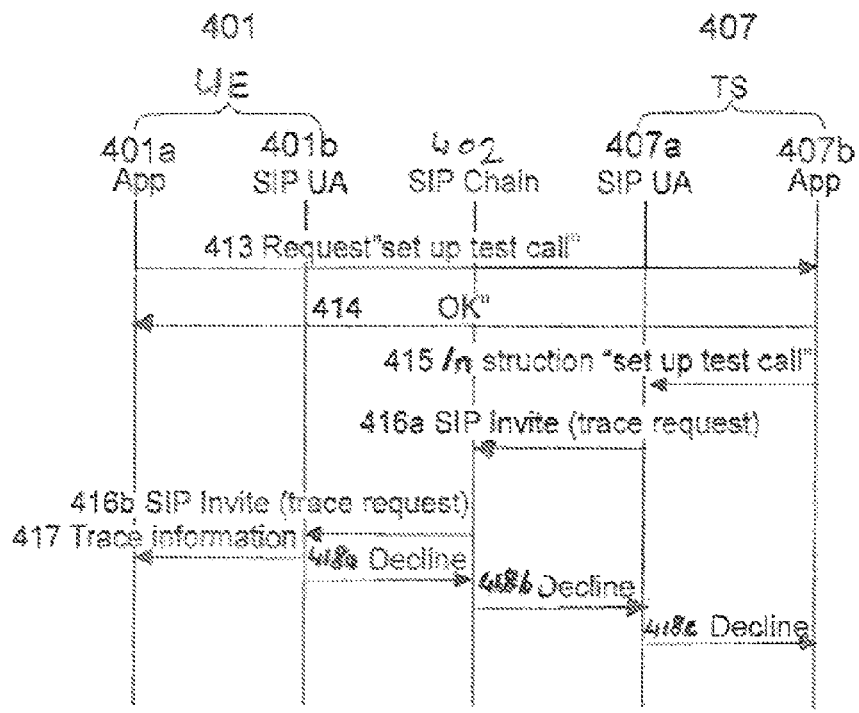
FIG. 4A shows a time-sequence diagram of generating trace information according to an exemplary embodiment of the invention.
Figure 4B:
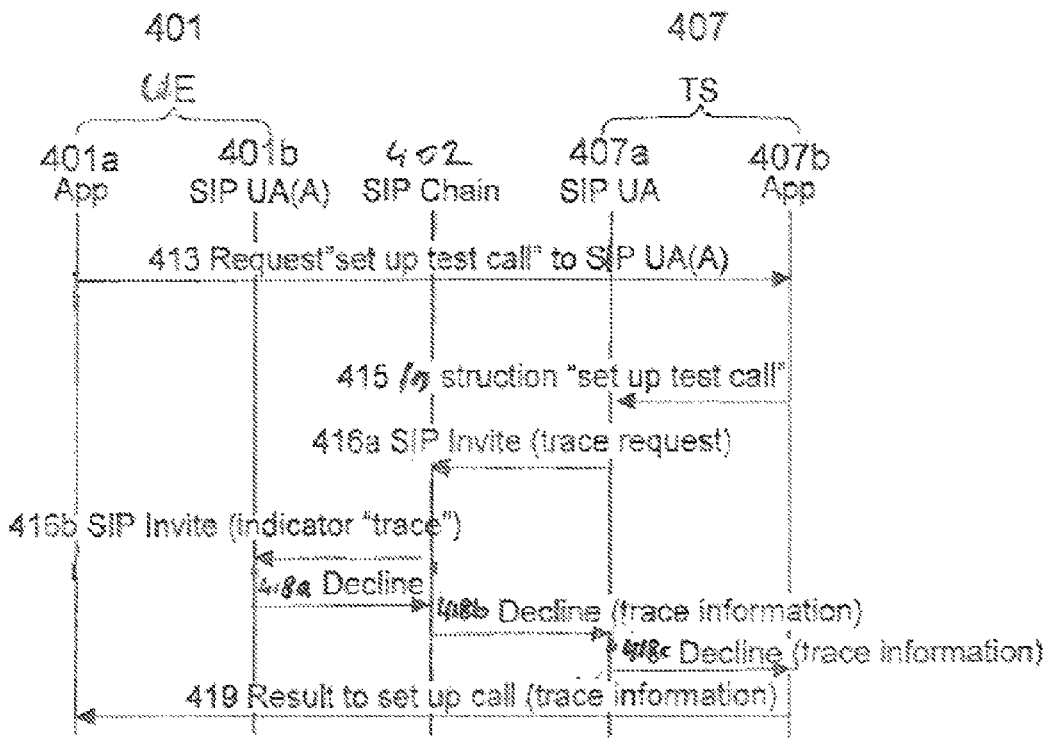
FIG. 4B shows a time-sequence diagram of generating trace information according to another embodiment of the invention.
Figure 4C:
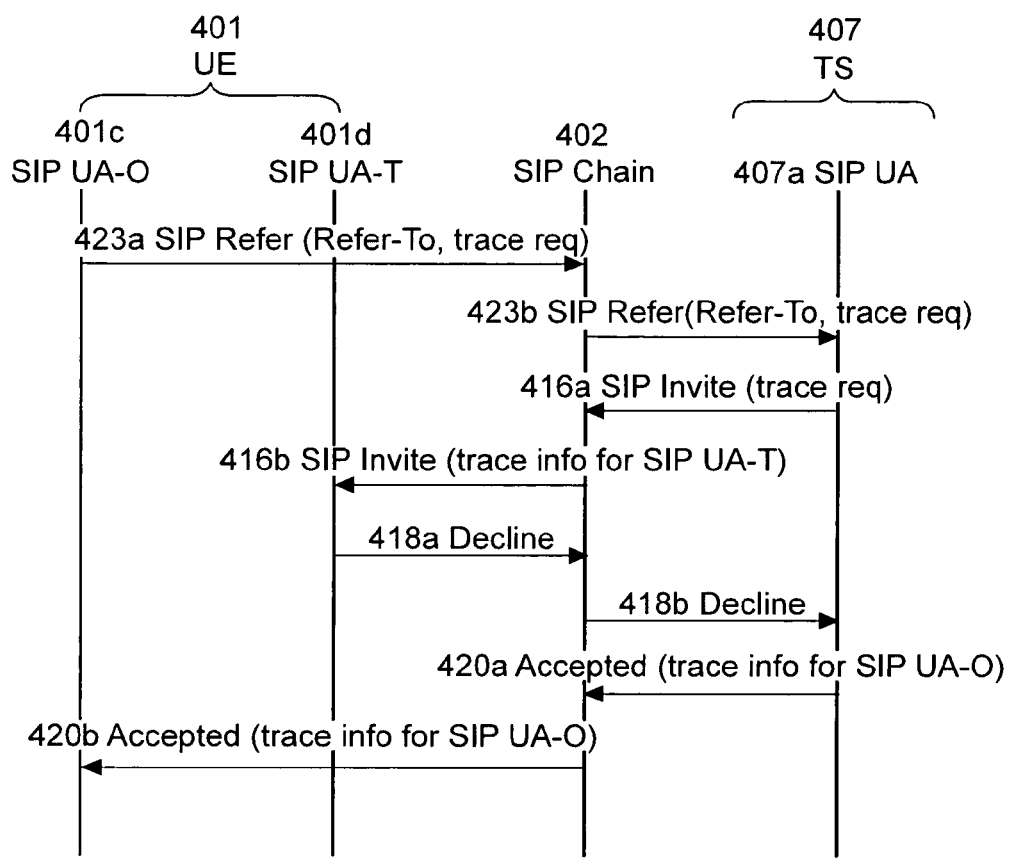
FIG. 4C shows a time-sequence diagram of generating trace information according to another embodiment of the invention.

FIGS. 4A-4C relate to a user, utilizing user equipment UE 401, requesting trace information of an incoming call. The user of UE 401 desires trace information on SIP signaling for incoming SIP calls. UE 401 uses a communication protocol to contact Test Server (TS) 407 and requests TS 407 to set up a call to UE 401. The request to TS 407 "set up test call" can be sent by means of, for example:

1. HTTP (click-to-call);
2. SIP Invite, TS 407 is a SIP Application Server (AS) which answers the SIP Invite and originates an unrelated call to the SIP UA 401b, 401d of the UE 401;
3. SIP Refer outside dialog, TS 407 acts as SIP UA 407a and sets up a call to the SIP UA 401b, 401d in the user's UE 401, see [3, chapter 4.1].

In all cases Test Server TS 407 sets up a call to UE 401 including a Trace request. This causes trace information to be generated by TS 407 and by the intermediate SIP chain 402, see also FIG. 3 302a-302d, which can be reported to the SIP UA 401b or 401d of the user UE 401 using different mechanisms:

1. Trace information is included in the SIP Invite message 416a, 416b to the SIP UA 401b, 401d of the user UE 401. This trace information relates to the request to set up a call travelling from TS 407 to UE 401;
2. The collected trace information is reported back to TS 407 in the manner that is appropriate for the establishment of the call from TS 407 to UE 401, namely by including the collected trace information in the response message to TS 407. TS 407 uses a response message 419, 420a and 420b (FIGS. 4B, 4C) according to the protocol that was used to request the test call set up using request message 413 to transfer the collected trace information to UE 401. The trace information obtained by UE 401 consists in this manner of trace information related to the SIP Invite message from TS 407 to UE 401, as well as trace information related to the response message from UE 401 to TS 407.

The following scenarios illustrate different cases for obtaining trace information for incoming calls at UE 401. Each of the cases uses one or more of the abovementioned options. Note that the list of scenarios is not exhaustive.

FIG. 4A shows a time-sequence diagram of generating trace information according to an exemplary embodiment of the invention. UE 401 sends request 413 to set up a call to TS 407, TS 407 sends SIP Invite 416a to UE 401, trace information arrives with the SIP Invite 416b.

Some protocol (e.g. HTTP or SIP) may be used to send request 413 to set up a test call to test server TS 407, i.e. an application 407b in TS 407. The application 407b sends a confirmation response "OK" 414 and instructs 415 the TS SIP UA 407a to send a SIP Invite 416a including a trace request to UE 401, i.e. the SIP UA 401b thereof. The SIP invite 416a is routed by the SIP chain 402 (see FIG. 3 302a-302d) to SIP UA 401b. While routing the SIP Invite 416a, 416b, trace information is collected, the trace information arriving together with SIP Invite 416b at the SIP UA 401b, where the trace information is delivered to an application within UE 401. The SIP UA 401b rejects the incoming call as it is only for tracing purposes by sending a "Decline" 418a message to TS 407. This message is forwarded by the SIP chain 402 to the SIP UA 407a of TS 407.

To set up a signalling path, TS 407 may also use a SIP Info message. The SIP Info message will also build up the requested trace information. On arriving at the SIP UA of UE 401 the trace information 417 is delivered and can be displayed. In this case the SIP UA of UE 401 accepts the SIP Info message by sending a "OK" message to TS 407.

FIG. 4B shows a time-sequence diagram of generating trace information according to another embodiment of the invention. Also in this embodiment a protocol (e.g. HTTP or SIP) is used to send a request message 413 to set up test call to the test call TS 407, TS 407 sends a SIP Invite 416a to UE 401, trace information is received at UE 401 from TS 407, after which the SIP invite 416b from TS 407 is rejected.

More in detail, TS 407, i.e. an application 407b therein, instructs 415 the TS SIP UA 407a to send a SIP Invite 416a to the SIP UA 401b of UE 401. SIP UA 401b having received trace information of the routing from TS 407 to UE 401, rejects the incoming SIP Invite 416b as it is intended only for tracing purposes as indicated by the indicator "trace" in the SIP Invite message 416b. The P-CSCF in the SIP chain 402 serving SIP UA 401b, being the receiver of the SIP Invite 416b sends the trace information to the originator of the SIP Invite, i.e. the test server TS 407. Subsequently the TS 407 sends the trace information 419 to UE 401 according to the protocol previously used by UE 401 to request (413) TS 407 to initiate the test call. Again, as in the previous example, a SIP Info message could be used instead of SIP Invite 416a to establish a path between TS 407 and UE 401.

FIG. 4C shows a time-sequence diagram of generating trace information according to another embodiment of the invention. UE 401 sends a request to TS 407 using a SIP Refer message 423, TS 407 responds with SIP Invite 416a, trace information is received at UE 401 from TS 407, after which UE rejects the call from TS 407.

User Equipment UE 401 has a user agent SIP UA-O 401c acting as originator of a SIP request 423a and a user agent SIP UA-T 401d acting as termination of a SIP request 416b from TS 407. In a combined test call, trace information will be collected for a SIP transaction from UE 401 to TS 407 and for a SIP transaction from TS 407 to UE 401. SIP UA-O 401c sends a request 423a to TS 407 in the form of a SIP Refer message (see [3], chapter 4.1). This Refer message 423a (including a trace request) instructs the test server TS 407 to set up a test call, i.e. to send a SIP Invite 416a. When the Refer message 423a arrives at TS 407, it contains trace information related to the outgoing request message from UE 401. The SIP UA 407a of TS 407 sends a SIP Invite 416a with trace request in response to the received SIP Refer message 423b. The SIP Invite message 416a travels to the SIP UA-T 401d while building up trace information. The SIP Invite message 416b received by the SIP UA-T 401d contains the desired trace information. SIP UA-T 401d rejects the incoming call as it is for tracing purposes only. However SIP Invite message 416b holds incoming trace information as was also described in the previous examples. SIP UA-T 401d may subsequently send a "Decline" message 418a to the test server TS 407, which is forwarded (418b) by SIP chain 402 to the SIP UA 407a. When the forwarded "Decline" message 418b arrives at TS 407, it contains trace information related to the incoming request message 416b for UE 401 as well as the related response message 418a from UE 401. On arrival of the "Decline" message 418b, the SIP UA 407a sends a "Accepted" message 420a which holds trace information for the SIP UA-O 401c of UE 401. The Accepted message 420a is forwarded by SIP chain 402 to SIP UA-O 401c. The received Accepted message 420b has the trace information. The trace information can thus contain trace information for outgoing SIP messages relating to UE 401, i.e. an outgoing session, as well as trace information for incoming SIP messages relating to UE 401, i.e. an incoming session. So using a SIP Refer message 423*a* as a request for access to the test server TS 407, the possibility to get trace information for incoming and outgoing SIP messaging in a single procedure is enabled.

A help desk agent desires tracing information from a UE for in- and outgoing calls, relative to the UE. In this case the help desk is the originating node and the UE the destination node. The agent sends a message to the UE, the UE responds by sending a SIP Invite to the help desk agent UA.

Figure 5A:
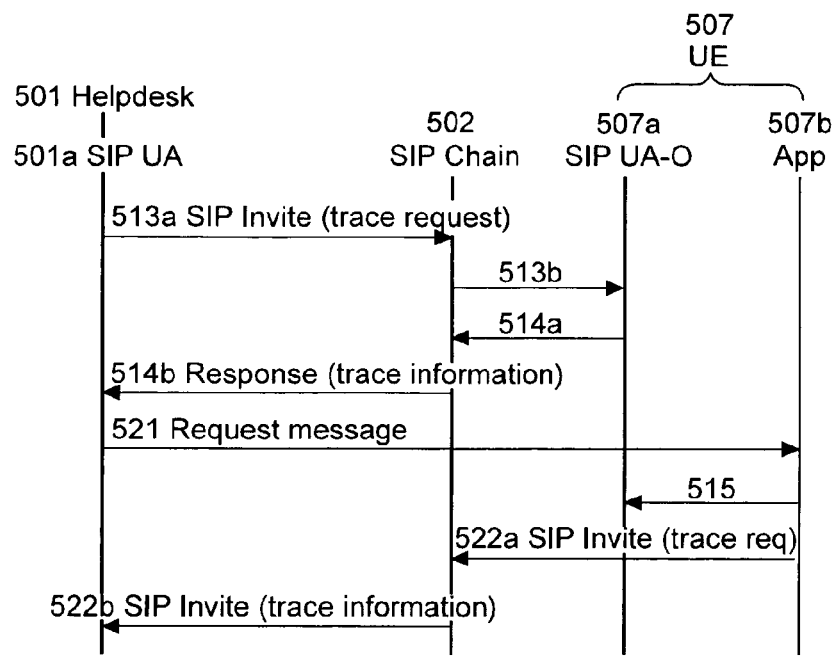
FIG. 5A shows a time-sequence diagram of generating trace information according to another embodiment of the invention.

FIG. 5A shows a time-sequence diagram of generating trace information according to another embodiment of the invention. The helpdesk 501 sets up a call to the UE 507 with a trace request. The UE 507 sends a response with trace information of the incoming call from the helpdesk 501. Furthermore the helpdesk 501 sends a request to set up an outgoing call to the UE 507, the UE 507 subsequently sets up the call to the helpdesk with a trace request, the trace information of the outgoing call is received at the helpdesk 501.

More in detail, the help desk SIP UA 501*a* sends a SIP Invite 513*a*, 513*b* with trace request via SIP chain 502 to the SIP UA 507*a* of UE 507. In response SIP UA 507*a* sends a response message having trace information to SIP UA 501*a*. The trace information relates to the SIP Invite message 513*a* and to the forwarded SIP Invite 513*b*.

To obtain trace information for the outgoing call of UE 507, the help desk SIP UA 501*a* sends a request message 521 via e.g. a SIP chain 502 to an application App 507*b* in UE 507. The application App 507*b* causes 515 the SIP UA 507*a* of UE 507 to send a SIP Invite 522*a* having a trace request to set up the call. The incoming SIP Invite 522*b* arriving at the help desk SIP UA 501 contains the needed trace information. This trace information relates to the request message by UE 507, i.e. SIP Invite 522*a* and SIP Invite 522*b*.

Figure 5B:
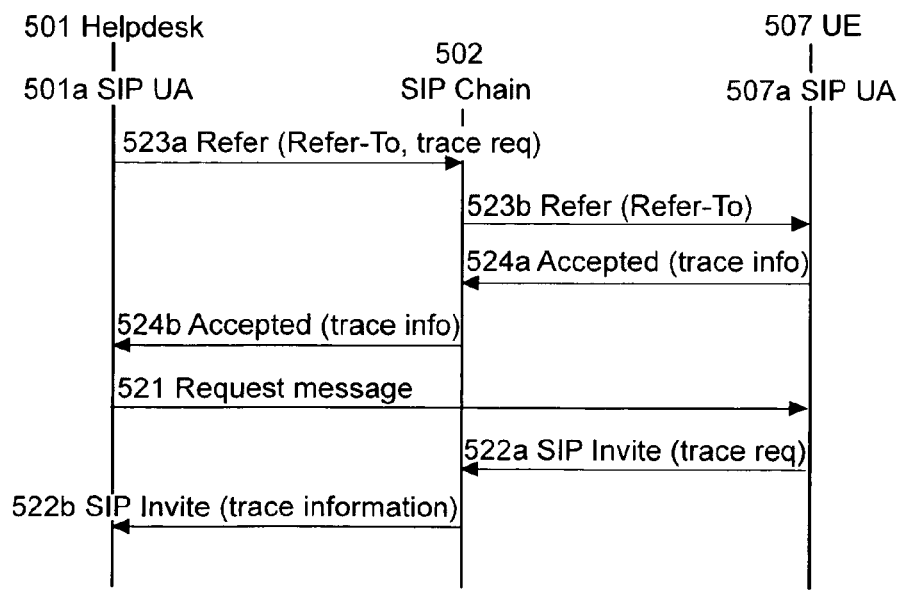
FIG. 5B shows a time-sequence diagram of generating trace information according to another embodiment of the invention.

FIG. 5B shows a time-sequence diagram of generating trace information according to another embodiment of the invention. In this embodiment the sequence is like the one in the example of FIG. 5A, except that a SIP Refer message is used by the helpdesk to set up the connection to the UE 507.

More in detail, the help desk SIP UA 501*a* sends a SIP Refer message 523*a* to the SIP UA 507*a* in UE 507. The SIP Refer message 523*a* contains a trace request. The SIP Refer message 523*a* is routed by SIP chain 502 to the SIP UA of UE 507. On arrival of the SIP Refer message 523*b*, SIP UA 507*a* sends a "Accepted" message 524*a* to the help desk SIP UA 501*a* containing trace information. Subsequently help desk SIP UA 501*a* receives the trace information from the Accepted message 524*b*, routed back to the help desk SIP UA 501*a* by the SIP chain 502. Subsequently SIP UA 507*a* sends a SIP Invite message 522*a* including a trace request. The SIP Invite message 522*a* is routed by the SIP chain 502 to the help desk SIP UA 501*a* and builds up trace information while being routed. The trace information relates to the outgoing call from the SIP UA 507*a* of UE 507 to the help desk SIP UA 501*a*.

Alternatively, not shown in the Figures, the "call back request" from the help desk can be handled by different entities in the SIP chain 502. It can be handled (1) by the SIP UA of the UE 507, (2) by an attached function in the UE (e.g. ADSL modem at the subscriber premises, or (3) by a test function in the P-CSCF of the SIP chain 502 serving the UE 507.

The SIP trace information contains addressing information generated by each proxy, node or user agent while routing a SIP Invite request or response message. The addressing information may comprise the information as shown in Table 1.

TABLE 1

Trace information

| Information element | Description |
|---|---|
| Request message - these are the information elements added to the trace information for a request message. | |
| Source address | This is the address of the sender of the message. It contains IP address and optional port number. |
| Destination address | This is the destination address of the message. It contains IP address and optional port number. |
| Transport | Transport protocol used for sending the message; UDP, TCP or SCTP. The combination of (i) source address and port, (ii) destination address and port and (iii) transport provides indication of how the message is transported through the IP network. |
| Request URI | Request URI of the request message, including R-URI parameters. |
| Route header | Route header of this SIP message. Each proxy that generates addressing information records only the topmost Route header. Rationale is that any Route header below the topmost Route header will be recorded by the next proxy in the chain (downstream). The combination of R-URI and Route header provides indication of how the message will be routed through the IMS network. |
| Response message - these are the information elements added to the trace information for a response message. | |
| Source address | This is the address of the sender of the message. It contains IP address and optional port number. |
| Destination address | This is the destination address of the message. It contains IP address and optional port number. |
| Transport | Transport protocol used for sending the message; UDP, TCP or SCTP. |
| Via header | Via header used for routing the response message. Each proxy that generates addressing information records only the topmost Via header. Rationale is that any Via header below the topmost Via header will be recorded by the next proxy in the chain (upstream). Routing of the response message is fully determined by the Via headers. |

Table 1 lists the information elements directly related to message routing. Inclusion of other information elements in the SIP trace information is possible.

A SIP request may be traced selectively. When a SIP UA initiates a transaction and requests a SIP trace for the transaction, it does so for learning the exact path the SIP Invite request takes (and possibly other information related to the end-to-end transfer of the SIP Invite request). The SIP UA may or may not be interested in learning the exact path of the response message (and possibly other information related to the end-to-end transfer of the SIP Invite response). In order to give the SIP UA the flexibility to indicate for which messages a SIP trace is requested, the suggested Trace-request SIP header may contain a set of message identifiers, indicating for which messages a SIP trace is requested. Examples are given in table 2.

TABLE 2

Examples of trace requests.

| Trace-request | Indication |
|---|---|
| all | the SIP Invite (or Info, Message etc.), the request message, as well as all response messages shall be traced |

TABLE 2-continued

Examples of trace requests.

| Trace-request | Indication |
|---|---|
| request | only the request message shall be traced. |
| request, 2xx | only the request message as well as 2xx responses shall be traced. |
| request, 1xx, 2xx | only the request message as well as 1xx responses and 2xx responses shall be traced. |

A SIP request may be forked while routing. When a SIP Invite request is forked, the forking entity should add a SIP-trace-request to each of the new (forked) SIP Invites. The forking entity should, in addition, add the trace information, as accumulated so far in the SIP Invite, to each of the individual forked Invite request messages. The destination IP address and Route header will differ per set of trace information in the different SIP Invite request messages. The initiator of the Invite transaction may in this case receive multiple sets of trace information, one set from each one of the destination addresses.

Figure 6:
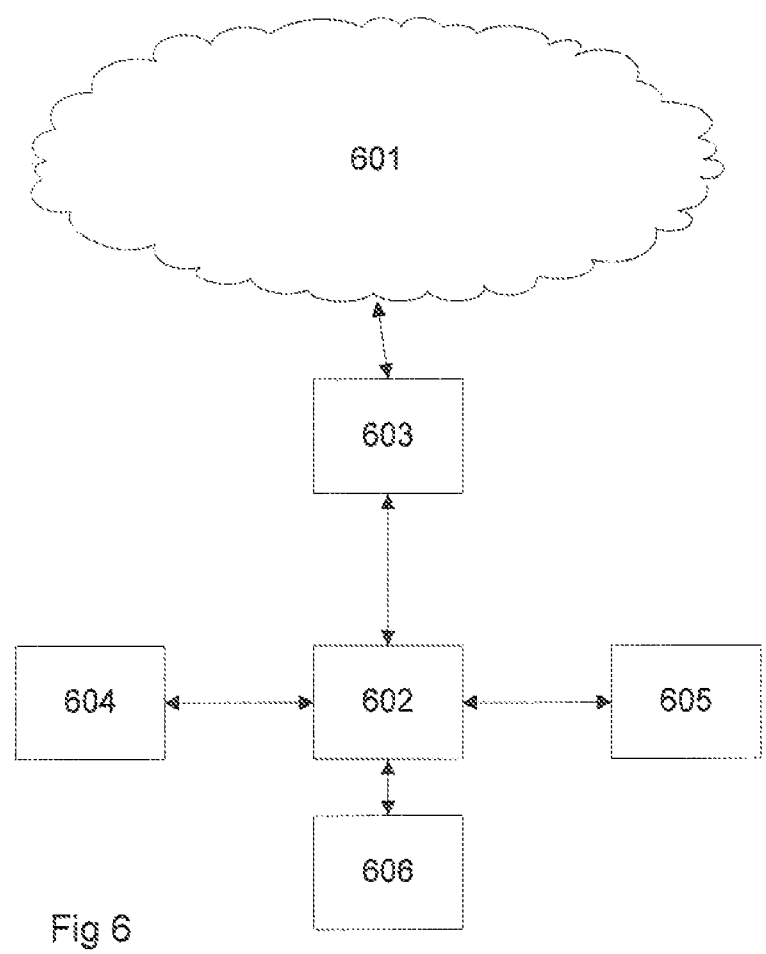
FIG. 6 shows a block diagram of any of the nodes according to an embodiment of the invention.

FIG. 6 shows a block diagram of a node used in the invention as a first, second or third node as described above. The general structure for these nodes is similar or the same. The node may be a telephone or terminal, wired or wireless. The node may also be a switch used in the packet switched network. Furthermore the node may also be a server. The node in general comprises a processor 602, a communication interface 603, a storage medium 604 and optionally a display 605, all connected to and cooperating the processor 602. The communication interface allows the node to communicate with the packet switched network. 601. The processor 602 may be a microprocessor or controller. The communication interface may comprise hard- and software suitable for communicating with the packet switched network. The interface and packet switched network may be wired or wireless. Various standards and protocols may apply, such as GSM, GPRS, and UMTS or third (3G) or later generation networks. In particular may the network be an IP Multimedia Subsystem also referred to as IMS network and subsequently the interface 603 adapted for that purpose. The network 601 and interface 603 may support more than one protocol. The interface 603 may also support and be connected to more than one network 601, each network having its own protocol for communication.

The display 605 may be used to display graphical or kextual content transferred via the network 601 and/or to control and operate the node. Furthermore the display may be used to display the collected signalling information to a user of the node. For that purpose also an optional input device 606, such as a keyboard may be provided. The skilled person is normally familiar with all variants of the nodes described, therefore a further detailed description is not provided in this text.

The above described embodiments are intended as examples only. Modifications with other implementations may be feasible without departing from the scope of the invention as determined by the claims below.

REFERENCES

[1] http://tools.ietf/id/draft-kaplan-dispatch-session-id-00.txt
[2] http://tools.ietf.org/id/draft/-dawes-sipping-debug-02.txt
[3] http://www.ietf.org/rfc/rfc3515.txt

The invention claimed is:

1. A method for obtaining signalling information in a packet switched network, the method comprising:
   a first node generating a first request message for setting UP a test call during an established call between the first node and a second node in the packet switched network, the first request message comprising a first request for collecting signalling information;
   the first node sending the first request message towards the second node;
   the second node sending a call setup request message to the first node on receipt of the first request message for setting up the test call, the call setup request message comprising a trace request and trace information;
   routing the call setup request message between the first node and the second node via at least one third node in the packet switched network, the at least one third node adding signalling information relating to the third node to the trace information of the call setup request message;
   the first node receiving the call setup request message, the call setup request message comprising trace information added by any third node between the second node and the first node;
   wherein the call setup request message comprises additional signalling information added by another third node of the at least one third node, the another third node involved in the sending the first request message towards the second node;
   wherein the additional signalling information is collected by the another third node in response to the call setup request message.

2. The method of claim 1, further comprising the first node:
   including trace information from the received call setup request message in a second response message; and
   sending the second response message to the second node in response to the receiving of the call setup request message.

3. The method of claim 2:
   wherein the call setup request message comprises additional signalling information added by another third node of the at least one third node, the another third node involved in the sending the second response message from the first node to the second node;
   wherein the additional signalling information is collected by the another third node in response to the second response message.

4. The method of claim 1:
   wherein the call setup request message comprises additional signalling information added by another third node of the at least one third node, the another third node involved in the sending the call setup request message towards the second node;
   wherein the additional signalling information is collected by the another third node in response to the call setup request message.

5. The method of claim 1, wherein the call setup request comprises a second request for collecting signalling information.

6. The method of claim 1:
   wherein the call setup request message comprises additional signalling information added by another third node of the at least one third node, the another third node involved in the routing the call setup request message between the first node and the second node;

wherein the additional signalling information is collected by the another third node in response to the call setup request message.

7. The method of claim 1, wherein the call setup request message is a Session Initiation Protocol message.

8. The method of claim 1, wherein the first request message for setting up the test call is a Session Initiation Protocol Refer message.

9. A node for acting as a first node in a packet switched network, the node comprising:
- a processor;
- a storage medium;
- a communication interface for communicatively connecting the node to the packet switched network, the communication interface configured to send and receive messages to and from the packet switched network;
- the processor configured to:
  - generate a first request message for setting up a test call during an established call between the first node and a second node in the packet switched network, the first request message comprising a first request for collecting signalling information;
  - send the first request message towards the second node;
  - receive, via the communication interface, a call setup request message sent by the second node, the call setup request message having signalling information added thereto by at least one third node in response to the request for collecting signalling information;

wherein the call setup request message comprises additional signalling information added by another third node of the at least one third node, the another third node involved in the sending the first request message towards the second node;

wherein the additional signalling information is collected by the another third node in response to the call setup request message.

* * * * *

UNITED STATES PATENT AND TRADEMARK OFFICE
CERTIFICATE OF CORRECTION

PATENT NO. : 8,923,140 B2  
APPLICATION NO. : 13/703781  
DATED : December 30, 2014  
INVENTOR(S) : Noldus et al.

Page 1 of 1

It is certified that error appears in the above-identified patent and that said Letters Patent is hereby corrected as shown below:

In the Specification

In Column 2, Line 44, delete "nodein" and insert -- node in --, therefor.

In Column 5, Line 45, delete "addressing oor" and insert -- addressing or --, therefor.

In Column 5, Line 52, delete "are ued" and insert -- are used --, therefor.

In Column 7, Line 17, delete "FIG.3302a-302d," and insert -- FIG.3 302a-302d, --, therefor.

In Column 7, Line 52, delete "FIG.3302a-302d)" and insert -- FIG.3 302a-302d) --, therefor.

In Column 8, Line 34, delete "request 416b" and insert -- request 423b --, therefor.

In Column 9, Line 33, delete "SIP UA 501" and insert -- SIP UA 501a --, therefor.

In Column 11, Line 33, delete "network. 601." and insert -- network 601. --, therefor.

In Column 11, Lines 47-48, delete "kextual" and insert -- textual --, therefor.

Signed and Sealed this  
Twenty-third Day of February, 2016

Michelle K. Lee  
*Director of the United States Patent and Trademark Office*